US011933488B2

(12) United States Patent
Vissenberg et al.

(10) Patent No.: US 11,933,488 B2
(45) Date of Patent: Mar. 19, 2024

(54) LED LUMINAIRE WITH OPTICAL ELEMENT

(71) Applicant: SIGNIFY HOLDING B.V., Eindhoven (NL)

(72) Inventors: Michel Cornelis Josephus Marie Vissenberg, Roermond (NL); Johannes Petrus Maria Ansems, Hulsel (NL); Olexandr Valentynovych Vdovin, Maarheeze (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 17/919,277

(22) PCT Filed: Apr. 14, 2021

(86) PCT No.: PCT/EP2021/059661
§ 371 (c)(1),
(2) Date: Oct. 16, 2022

(87) PCT Pub. No.: WO2021/213858
PCT Pub. Date: Oct. 28, 2021

(65) Prior Publication Data

US 2023/0160556 A1 May 25, 2023

(30) Foreign Application Priority Data

Apr. 21, 2020 (EP) .................................... 20170536

(51) Int. Cl.

| | |
|---|---|
| ***F21V 7/05*** | (2006.01) |
| ***F21V 11/02*** | (2006.01) |
| ***F21Y 105/10*** | (2016.01) |
| ***F21Y 115/10*** | (2016.01) |

(52) U.S. Cl.
CPC ................ *F21V 7/05* (2013.01); *F21V 11/02* (2013.01); *F21Y 2105/10* (2016.08); *F21Y 2115/10* (2016.08)

(58) Field of Classification Search
CPC .................................. F21V 7/05; F21V 11/02
See application file for complete search history.

(56) References Cited

U.S. PATENT DOCUMENTS

| | | | | |
|---|---|---|---|---|
| 3,693,515 | A | 9/1972 | Baker | |
| 10,458,618 | B2 * | 10/2019 | Gloss | F21S 45/47 |
| 10,598,344 | B2 * | 3/2020 | Livesay | F21K 9/20 |
| 2006/0152931 | A1 | 7/2006 | Holman | |
| 2008/0285280 | A1 | 11/2008 | Snijder et al. | |

(Continued)

FOREIGN PATENT DOCUMENTS

| | | | |
|---|---|---|---|
| CN | 1915374 | A | 2/2007 |
| CN | 201382286 | Y | 1/2010 |

(Continued)

*Primary Examiner* — Bryon T Gyllstrom

(57) ABSTRACT

An LED luminaire, which comprises an LED array of LED elements and an optical element. The optical element comprises one or more partially reflective or partially transmissive elements, which are positioned to lie perpendicular to a plane of the LED array. In this way, the partially reflective elements create virtual sources or virtual LED elements, by reflecting part of the light emitted by an LED element, whilst allowing the original or "real" LED element to still be visible by partially transmitting the light.

15 Claims, 5 Drawing Sheets

(56) References Cited

U.S. PATENT DOCUMENTS

| | | | | |
|---|---|---|---|---|
| 2009/0141490 | A1 | 6/2009 | Tsai | |
| 2010/0252846 | A1 | 10/2010 | Bierhuizen et al. | |
| 2011/0075420 | A1 | 3/2011 | Van Gorkom et al. | |
| 2012/0051058 | A1* | 3/2012 | Sharma | F21V 29/505 362/294 |
| 2012/0057340 | A1* | 3/2012 | Rami | F21V 7/0083 362/231 |
| 2012/0075847 | A1 | 3/2012 | Chang et al. | |
| 2012/0206911 | A1* | 8/2012 | Pickard | F21V 3/049 362/231 |
| 2015/0204518 | A1* | 7/2015 | Leschev | F21V 7/0008 362/297 |
| 2015/0267885 | A1* | 9/2015 | Freier | F21V 5/005 362/307 |
| 2019/0137072 | A1 | 5/2019 | Vissenberg et al. | |

FOREIGN PATENT DOCUMENTS

| | | | |
|---|---|---|---|
| CN | 201875451 | U | 6/2011 |
| CN | 107709870 | A | 2/2018 |
| EP | 2230444 | A1 | 9/2010 |
| WO | 2013035012 | A2 | 3/2013 |
| WO | 2018065364 | A1 | 4/2018 |

* cited by examiner

LED LUMINAIRE WITH OPTICAL ELEMENT

CROSS-REFERENCE TO PRIOR APPLICATIONS

This application is the U.S. National Phase application under 35 U.S.C. § 371 of International Application No. PCT/EP2021/059661, filed on Apr. 14, 2021, which claims the benefit of European Patent Application No. 20170536.5, filed on Apr. 21, 2020. These applications are hereby incorporated by reference herein.

FIELD OF THE INVENTION

The present disclosure relates to the field of LED luminaires, and in particular, to LED luminaires having additional optical elements.

BACKGROUND OF THE INVENTION

LED luminaires are being increasingly used in commercial lighting installations, such as road lighting installations, industrial lighting installations or the like. In these circumstances, an LED luminaire usually comprises an array of LED elements, each formed from a visible-light LED and a corresponding lens.

This optical architecture is particularly advantageous in commercial lighting installations, as they are highly energy efficient. However, the use of a separate lens per LED results in the LED luminaire having an increased glare, e.g. compared to a single uniform light source the same size as the array.

There is therefore a desire to provide an LED luminaire that benefits from a reduced glare without being less energy efficient.

One possible approach could be to reduce the pitch of the LED array, i.e. to reduce a distance between different LED elements of the LED array. A reduction in pitch means that a human eye is less able to distinguish the separate LED elements, resulting in the light emitted by the luminaire appearing more uniform and less glary. However, a reduction in the pitch of the LED array leads to a higher cost, as the number of LED elements increases quadratically. The dimensions of the lenses would also be reduced, which makes them more difficult to manufacture.

SUMMARY OF THE INVENTION

The invention is defined by the claims.

According to examples in accordance with an aspect of the invention, there is provided an LED luminaire comprising: an array of LED elements, each configured to emit light, disposed in a first plane; and an optical element comprising one or more partially reflective elements, each partially reflective element being positioned so as to directly receive light emitted by an LED element of the array of LED elements and comprising a light incident surface positioned perpendicularly to the first plane and, wherein each partially reflective element is configured to reflect a first part of received light using at least the light incident surface and transmit a second, different part of the received light, and wherein at least one partially reflective element is positioned such that the virtual source of the first part of the directly received light, which is reflected using the light incident surface, lies between the LED element from which the partially reflective element directly receives light and an adjacent LED element.

The present disclosure uses one or more partially reflective elements to effectively split light emitted by an LED element, so that a first (reflected) part of the light emitted by the LED element appears to originate from a virtual source to the side of the LED element and a second (transmitted) part of the light emitted by the LED element appears to originate from the LED element itself.

This results in the effective pitch of the array of LED element being reduced, via the creation of one or more virtual sources ("virtual LED elements") between the ("real") LED elements, without the need to provide additional LED elements in the array. Thus, light emitted by a particular LED element appears to be at least partially redistributed across the real LED element and at least one virtual LED element, thereby reducing the apparent brightness of any single LED element (with minimal effect to the total magnitude of light output by the LED luminaire), thereby softening the appearance of the LED luminaire and reducing the apparent glare.

Moreover, existing LED boards and lens plates can be re-used, minimizing cost to the end-user.

The partially reflective element comprises a light incident surface that reflects at least some of the directly received light, i.e. contributes to the light reflection performed by the partially reflective element. The light incident surface thereby acts as an interface for reflecting light. The partially reflective element may comprise one or more other interfaces for reflecting the received light, i.e. to contribute to the first part of reflected light.

Positioning the light incident surface, which is used to reflect light, perpendicularly to the first plane results in light reflected using at least the light incident surface appearing to come from a same virtual LED element, reducing an apparent or effective pitch of the LED array. This approach also means that the reflected and transmitted parts of the beam are directed away from the first plane, to maintain a total magnitude of light output by the LED luminaire (assuming negligible scattering and absorption). The proposed approach avoids light (that would previously have been output by the LED luminaire) being reflected back to the LED array.

Preferably, the light incident surface is a substantially flat and/or smooth surface area (i.e. a smooth surface), to increase the apparent brightness uniformity of the LED luminaire and reduce a deviation from the original luminous intensity distribution. A flat surface area helps avoid the surface deviating from the perpendicular symmetry plane. A (optically) smooth surface reduces scattering, so that reflection and/or transmission is specular or near-specular.

At least one partially reflective element is disposed between two adjacent LED elements of the array of LED elements, such that the virtual source of the directly received light from one of these two elements, which has been reflected using at least the light incident surface, lies between the two adjacent LED elements. This increases the apparent positional uniformity (e.g. spread) of the real and virtual LED elements and the uniformity of the brightness of light output therefrom. Preferably, at least one partially reflective element is disposed between two adjacent LED elements such that this virtual source lies (approximately) midway between the two adjacent LED elements.

In some embodiments, each LED element of the array of LED elements is configured to emit light having a luminous intensity distribution having at least one mirror symmetry plane, and the light incident surface of each partially reflective element is positioned in parallel to a mirror symmetry plane of one or more luminous intensity distributions of an LED element from which it directly receives light. Aligning the light incident surface of each partially reflective element in parallel to a mirror symmetry plane results in the virtual source appearing to have a partial luminous intensity distribution that is symmetric to part of the luminous intensity distribution of the LED element from which it directly receives light. This increases a uniformity of the luminous intensity output across the LED luminaire, which is perceived by a viewer with respect to a particular viewing direction and reduces glare. In particular, this approach makes all sources (real and virtual) appear to be of more uniform brightness from a range of viewing directions.

Preferably, the optical element is configured such that, for each partially reflective element, first light output by the LED luminaire which was last reflected by the said partially reflective element, has corresponding second light output by the luminaire which was last reflected by another partially reflective element, the corresponding second light having mirror symmetry with respect to the said first light with respect to a plane of symmetry parallel to said partially reflective element.

In other words, each of a plurality of light rays (which have undergone reflection by any of the partially reflective elements) or "plurality of reflected light rays" may be one of a set of two reflected light rays (which have undergone reflection by any of the partially reflective elements) output by the LED luminaire. A first light ray in the set of two light rays has mirror symmetry to the second, other light ray in the set of two lights rays with respect to a plane of symmetry parallel to partially reflective element that last reflected the first light ray (before the luminaire output the set of light rays).

Preferably, each of the plurality of reflected light rays may have its own, unique corresponding mirror image reflected light ray.

The plurality of light rays may comprise no less than 90% of all light rays output by the LED luminaire that have been reflected by a partially reflective element, for example, no less than 95%, for example, no less than 99%.

This configuration may result in the overall luminous intensity distribution of the LED luminaire being unchanged (within a reasonable margin of error, e.g. ±10% or ±1%) compared to an LED luminaire that does not comprise the optical element, but has improved apparent brightness uniformity.

Appropriate positioning and configuring of the partially reflective elements can achieve this configuration.

In particular, the partially reflective elements may be arranged so that each combination of an LED element and a partially reflective element (that reflects light output by the LED element) corresponds to another combination of another LED element and another partially reflective element that reflects light output by the another LED element. The light reflected by the another partially reflective element (received from the another LED element) is a mirror image of the light reflected by the original partially reflective element (received from the original LED element).

For example, this configuration can be achieved by forming each partially reflective element as one of two partially reflective elements that form a set of two partially reflective elements. The set of two partially reflective elements are positioned in parallel to one another, and are preferably positioned (and the LED array appropriately configured) so that light reflected by a first partially reflective element (of the set) is a mirror image of light reflected by a second partially reflective element (of that set).

This can be achieved by positioning a first partially reflective element on one side of an LED element, and positioning a second partially reflective element on an opposite side of an LED element (which may be the same LED element or a different LED element having the same light intensity distribution). The distance between the first partially reflective element and its corresponding LED element may be the same as the distance between the second partially reflective element and its corresponding LED element. Other than their position, the first and second partially reflective elements may be identical (within reasonable manufacturing tolerance).

If each partially reflective element is formed in this manner (i.e. forms part of a set meeting these requirements), then the overall luminous intensity distribution of the LED luminaire is unchanged (within a reasonable margin of error, e.g. ±10% ±1%) compared to an LED luminaire that does not comprise the optical element, but has improved apparent brightness uniformity.

Preferably, the first and second partially reflective elements of the set of partially reflective elements are positioned such that at least some of the light reflected by the first partially reflective element appears to come from a same virtual source as some of the light reflected by the second partially reflective element. This helps a virtual source appear to have a similar light distribution to the "real" LED elements. This approach makes all sources (real and virtual) appear to be of more uniform brightness from a range of viewing directions.

Preferably the luminous intensity distribution of light emitted by each (individual) LED element is identical. This increases a uniformity of the luminous intensity output across the LED luminaire which is perceived by a viewer with respect to a particular viewing direction and reduces glare In some embodiments, the luminous intensity distribution of light emitted by each LED element of the array of LED elements has a finite number of mirror symmetry planes.

Preferably, the distance between each partially reflective element and the LED element from which it directly receives light is between 0.1 and 0.4 times the distance between the LED element from which it directly receives light and the adjacent LED element.

The distance may be defined as a distance along the first plane, i.e. the distance between the LED element and the (projection of the) partially reflective element with respect to the first plane. By way of example, the first plane may define a horizontal plane and the distance may be defined as a horizontal distance between the partially reflective element and the LED element from which is directly receives light.

The inventors have identified that positioning each partially reflective element in this manner produces a LED luminaire having improved brightness uniformity.

Preferably, the distance between each partially reflective element and the LED element from which it directly receives light is between 0.2 and 0.3 times the distance between the LED element from which it directly receives light and the adjacent LED element, e.g. between 0.23 and 0.27 times the distance.

In some preferred embodiments, the distance between each partially reflective element and the LED element from which it directly receives light is different for each partially reflective element (and its respective LED element). In other words, there may be a slight randomization in the positioning of the different partially reflective elements, with respect to their respective LED elements. This embodiment improves the uniformity of the apparent brightness of light provided by the LED luminaire.

The distance between each partially reflective element and the LED element from which it directly receives light may differ by no more than 20% of the distance between adjacent LED elements, for example no more than 4% of the distance between adjacent LED elements. For example, if LED elements are positioned to be 25 mm apart, the distance between each partially reflective element and the LED element from which it directly receives light may differ by no more than 5 mm, e.g. no more than 1 mm.

In particular examples, a horizontal position (i.e. a position with respect to the first plane) of each partially reflective element is positioned to intersect a hypothetical line passing through the LED element from which the partially reflective element directly receives light and the adjacent LED element at an intersection position. The distance between the intersection position and the LED element from which the partially reflective element directly receives light may define the distance between the partially reflective element and the LED element.

Preferably, the thickness of each partially reflective element is no greater than 1 mm, preferably no greater than 0.8 mm and preferably no greater than 0.5 mm. For example, the thickness of each partially reflective element may be 0.5 mm. The inventors have noted that the thickness and shape of the elements can affect the performance of the optical element, e.g. as the edges of the elements can cause unwanted beam artefacts. Thinner partially reflective elements give greater optical performance, at the expense of ease of manufacturing. A maximum thickness of 1 mm, 0.8 and/or 0.5 mm gives a reasonable compromise between optical performance and manufacturability.

Preferably, the edge rounding of each partially reflective element is no greater than 0.3 mm, and preferably no greater than 0.2 mm, more preferably no greater than 0.1 mm. This characteristic (edge rounding) provides a reasonable compromise between performance and manufacturability. Edge rounding is defined as the radius of the transition between one side of the partially reflective element and the other side of the partially reflective element, at an end of the partially reflective element, and particularly at the end of the partially reflective element opposing (i.e. the most distant from) the first plane.

Preferably, at least one partially reflective element is configured to further receive a reflected first part of light and/or a transmitted second part of light that was directly received by at least one other partially reflective element, and is further configured to partially reflect and partially transmit the received first and/or second part of light.

In other words, light that is transmitted/reflected by one partially reflective element may interact with another partially reflective element (and be further partially reflected and transmitted). This creates an optical element in which light has multiple interactions with the optical element. This embodiment further increases a uniformity of the brightness distribution, by creating additional virtual sources (e.g. outside the bounds of the LED array).

This embodiment may also reduce a need for a partially reflective element to be highly reflective, as embodiments may instead rely upon multiple Fresnel reflections (from interacting with multiple partially reflective element) to achieve a same uniformity effect as using one highly reflective (e.g. >40% reflective, but <60% reflective) partially reflective element. Thus, partially reflective elements having a relatively low reflectivity (e.g. <40% or <30%) can be used.

Preferably, at least one partially reflective element has a length, in a direction perpendicular to the first plane, of no less than 0.4 times the distance between the LED element from which it directly receives light and the adjacent LED element, and preferably no less than 1 times the distance between the LED element from which it directly receives light and the adjacent LED element.

This embodiment may result in the partially reflective element being sufficiently long so that light reflected/transmitted by a partially reflective element further interacts with another partially reflective element, to achieve the same benefits as previously described (improved brightness uniformity, less reliance on an interaction with a single partially reflective element).

It will be appreciated that, in such embodiments, partially reflective elements closer to the edge of the LED array may have fewer interactions with light rays compared to the partially reflective elements in the center/middle of the luminaire. In some embodiments, partially reflective elements closer to the edge of the LED array may have a higher reflectivity compared to partially reflective elements in the center/middle of the LED array. This further improves a uniformity the brightness of the LED luminaire, in particular by increasing an apparent brightness uniformity of virtual LED elements across the LED array.

Similarly, light rays having greater angles with respect to a normal direction of the LED array (i.e. a direction normal to the first plane) will interact with more partially reflective elements than light rays emitted closer to normal direction. It may therefore be advantageous for at least one partially reflective element to have a greater reflectivity at a position more distant from the first plane than a position closer to the first plane. By way of example, a partially reflective element may have a gradient in reflectivity of the partially reflective element with respect to distance from the first plane or LED array, so that there is a higher reflectivity at the far end of the plate and a lower reflectivity closer to PCB. This gradient may be a gradual gradient or a step gradient. Such embodiments will result in improved uniformity of the brightness of light emitted by the LED luminaire, which is achieved by increasing a similarity in luminous intensity output by virtual LED elements across the LED array.

In embodiments, the first part and/or second part of the received light comprises no less than 25%, and no more than 75%, of the received light. In other words, the first/second part of light may comprise 25%-75% of received light.

Preferably the first or second part of the received light comprises no less than 40%, and no more than 60%, of the received light. Even more preferably, the first part or second part of the received light comprises no less than 45%, and no more than 55%, of the received light. Yet more preferably, the first or second part of the received light comprises no less than 48%, and no more than 52%, of the received light. For example, the first part of the received light may consist of around 50% (±1% or ±0.5%) of the received light and/or the second part of the received light may consist of around 50% (±1% or ±0.5%) of the received light.

It is acknowledged that angle of incidence of a light ray can affect the amount of that light ray that is reflected by a partially reflective element. The above-identified percentages refer to the average amount of light emitted by a particular LED element and received by a partially reflective element that is transmitted/reflected.

The more similar the percentage of reflected and transmitted light, the more uniform the appearance of the brightness distribution (i.e. the greater the reduction in apparent glare).

In some embodiments, the first part of the received light comprises no less than 75% of the received light having a wavelength lying within a first set of wavelengths; and the second part of the received light comprises no less than 75% of the received light having a wavelength lying within a second, different set of wavelengths. In other words, the received light may be divided chromatically, so that a first set of wavelengths is (mostly) transmitted with a different set of wavelengths being (mostly) reflected.

In some examples, each partially reflective element is configured such that, where the received light comprises a plurality of light rays, each light ray is partially transmitted and partially reflected by the partially reflected element.

In other words, each light ray received by the partially reflective element may be partially reflected and partially transmitted. Any reference to a "part of the received light", of any other herein described embodiment, may be replaced by a reference to "part of each received light ray", where appropriate to provide sub-embodiments of this embodiment.

In some examples, each partially reflective element comprises a light transmissive element coated with a partially reflective coating. A light transmissive element is any material through which light can travel, e.g. where more than 80% or 90% of light incident on the light transmissive element is transmitted therethrough (rather than being absorbed or reflected). Suitable examples of a light transmissive element can be made from: glass, polycarbonates and/or resins (e.g. PMMA). A partially reflective coating is any coating that partially reflective, e.g. a thin coating of aluminum or silver, although other embodiments are envisaged, e.g. any material having a high refractive index ($n>1.5$ or $n>1.7$).

By way of further example, the partially reflective coating may comprise a dichroic coating and/or a stack of one or more films or plates. One example of a dichroic coating is a multilayer stack of thin layers of materials having a different refractive index (analogous to a distributed Bragg reflector). The stack reflectivity varies dependent upon wavelength (and incidence angle).

A stack of one or more films or plates may be configured so that the (accumulative) Fresnel reflections off the stack interfaces result in incident light being partially reflected and partially transmitted.

In other examples, the partially reflective element comprises a perforated reflective element. A suitable example of a perforated reflective element is a perforated metallic reflector, although other examples would be apparent to the skilled person. In some embodiments, each partially reflective element comprises a light transmissive element coated with a pattern of partially or fully reflective patches. In these embodiments, the light incident on the partially reflective element is split spatially.

Preferably, each LED element of the array of LED elements comprises a light emitting diode, LED, and a lens configured to direct light emitted by the light emitting diode.

In some examples, the optical element further comprises a carrier configured to couple each partially reflective element to the array of LED elements.

These and other aspects of the invention will be apparent from and elucidated with reference to the embodiment(s) described hereinafter.

BRIEF DESCRIPTION OF THE DRAWINGS

For a better understanding of the invention, and to show more clearly how it may be carried into effect, reference will now be made, by way of example only, to the accompanying drawings, in which.

DETAILED DESCRIPTION OF THE EMBODIMENTS

Figure 1:
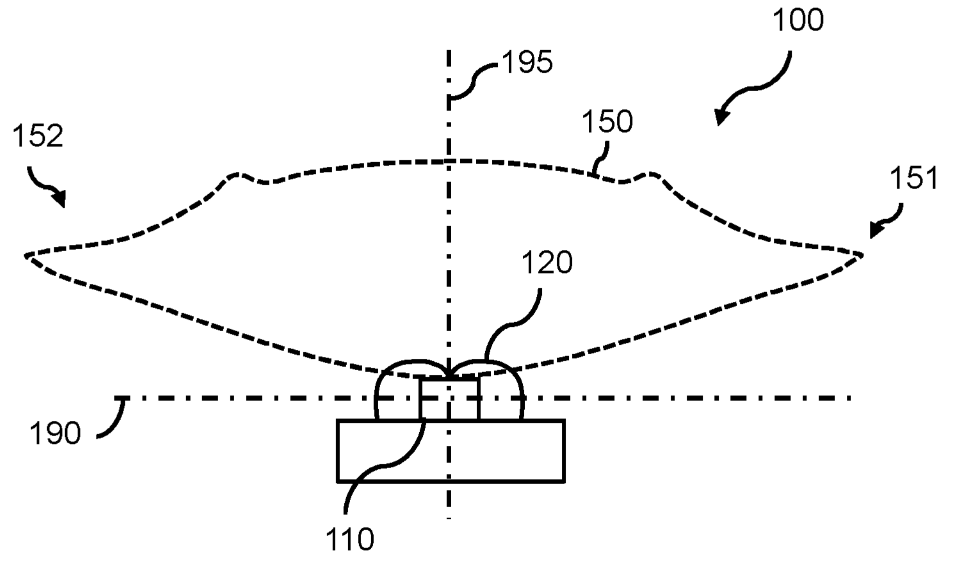
FIG. 1 illustrates an LED element for use in an embodiment of the invention.

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present disclosure will become better understood from the following description, appended claims, and accompanying drawings. It should be understood that the Figures are merely schematic and are not drawn to scale. It should also be understood that the same reference numerals are used throughout the Figures to indicate the same or similar parts.

The invention provides an optical element for an LED luminaire, which comprises an LED array of LED elements. The optical element comprises one or more partially reflective or partially transmissive elements, having a light incident surface positioned perpendicular to a plane of the LED array. The partially transmissive element uses at least the light incident surface to reflect light received by the partially transmissive element. In this way, the partially reflective elements create virtual sources or virtual LED elements, by reflecting part of the light emitted by an LED element, whilst allowing the original or "real" LED element to still be visible by partially transmitting the light. The partially reflective elements are positioned so that the virtual LED element is located between an LED element from which the partially reflective element directly receives light, and an adjacent LED element.

Embodiments find particular use in industrial lighting applications, such as street lighting or factory lighting, but can be used in any lighting installation that comprises an LED array of LED elements.

Throughout the present disclosure, any light that is not reflected is assumed to be transmitted by the partially reflective element, under the assumption that absorption or scattering is negligible. Any reference to a % of light in the present disclosure may therefore refer to a % of non-absorbed and/or non-scattered light.

FIG. 1 illustrates an LED element 100 for use in an embodiment of the invention. The LED element 100 comprises a light emitting diode, LED, 110 and a lens 120 for shaping the light emitted by the LED 110. The LED element 100 lies in plane 190, which may be a plane in which all elements of a larger LED array lie. The lens 120 may be replaced by any other suitable beam shaping optical element. FIG. 1 is a cross-sectional diagram of the LED element 100.

The lens 120 of the LED element 100 is configured such that the (intensity) shape/pattern 150 of light emitted by the LED 110 has mirror symmetry with respect to a plane 195 perpendicular to a plane 190 in which the LED element lies. The illustrated LED element has a single mirror plane 195.

In FIG. 1, the illustrated shape or pattern 150 of light is shown diagrammatically in a manner analogously to a conventional C-plane, and for the sake of improved contextual understanding only. An edge of the illustrated shape indicates a light intensity with respect to a direction of light from the LED 110, with increased distance from the LED 110 indicating increased light intensity being radiated in that direction.

The skilled person will appreciate that for different cross-sections of the LED element, the shape/pattern 150 of light may differ (e.g. be asymmetric in other planes).

The illustrated LED element may be of particular use, for example, in street lighting. For instance, the creation of an elongated illumination pattern on a road may be achieved by positioning two intensity peaks 151, 152 of the light emitted from the LED element to fall along the two directions of the road, away from the LED element 100. To make an intensity peak, the lens bulges, as illustrated, so that two peaks means a lens with two bulging sides. This helps provide efficient and even lighting along a road.

The LED element 100 is only one example of a suitable LED element suited for use in an embodiment of the invention. Other LED elements may be associated with more than one mirror plane and/or no mirror plane whatsoever (i.e. no mirror symmetry).

Preferably, LED elements used in the present disclosure have a finite number of mirror planes, to provide a highly efficient LED element with suitable light beam distribution for particular use case scenarios (such as road/street lighting). Such LEDs elements are particularly advantageous when employed or used in an LED luminaire herein described.

The skilled person will appreciate that the LED element 100 is only one example of a suitable LED element, and that other embodiments for (or examples of) an LED element will be apparent to the skilled person.

Figure 2:
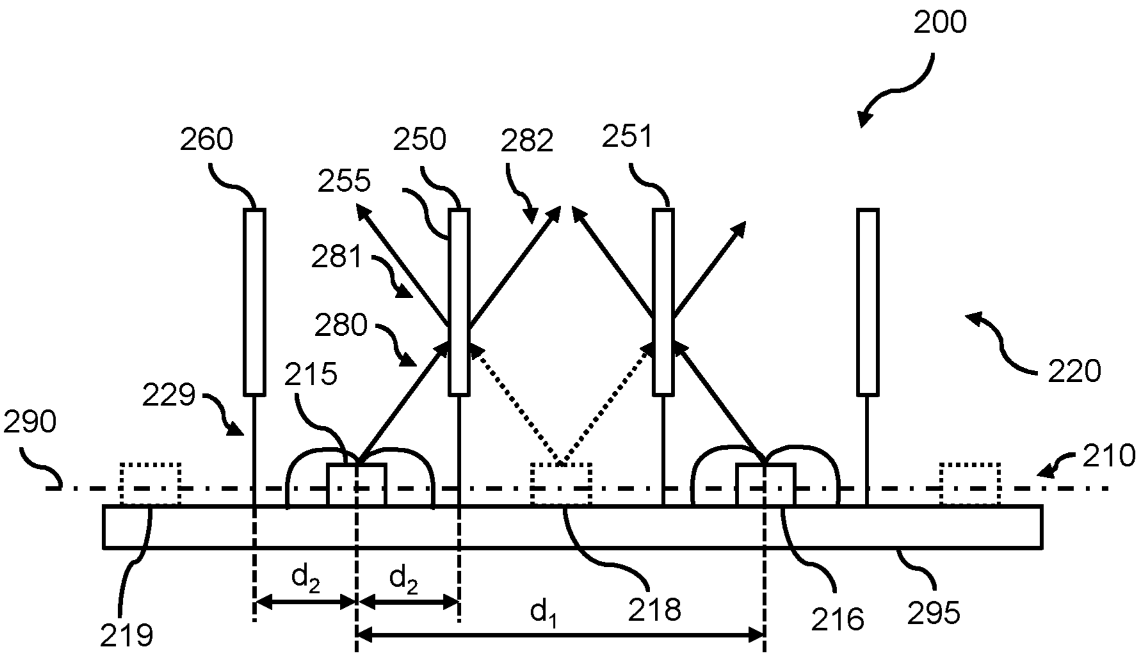
FIG. 2 is a side-view illustrating components of an LED luminaire according to an embodiment.

FIG. 2 illustrates an LED luminaire 200 according to an embodiment of the invention. The LED luminaire 200 comprises an LED array 210, formed of a plurality of LED elements 215, 216 and an optical element 220. The optical element 220 is formed from one or more partially reflective elements 250, 251, 260 each of which is positioned to directly receive light from an LED element 215, 216.

The LED array 210 may be mounted on a printed circuit board (PCB) 295, a substrate or any other suitable carrying mechanism. A PCB may be formed of any suitable material, such as paper, fiberglass (cloth), aluminum, resin and so on. A substrate may comprise any suitable material, e.g. silicon, $SiO_2$, $Al_2O_3$, $TiO_2$ and so on.

The optical element 220 may further comprise a carrier 229, e.g. formed of one or more carry elements, configured to couple each partially reflective element to the array of LED elements, e.g. via the printed circuit board 295 (or other carrying mechanism) if present. The carrier may comprise, for example, silicon, steel, aluminum or any other suitable mounting mechanism. The carrier can be omitted, with the partially reflective elements being directly mounted on the PCB or other carry mechanism.

The LED array lies within a first plane 290, so that each LED element 215, 216 of the LED array lies within this first plane 290. Each LED element may be labelled a "real light source" or "real LED element". The first plane 290 may, for example, be parallel to a plane of the printed circuit board 295 (or other suitable carrying mechanism). For the following description, the first plane defines the horizontal plane of the LED array (e.g. a horizontal distance is a distance along an axis parallel to the first plane).

The partially reflective elements 250, 251, 260 each comprise a light incident surface 255, upon which light 280 emitted by an LED element 215, 216, is incident. This light incident surface 255 is aligned to be perpendicular to the first plane 290. Preferably, the light incident surface is flat and/or smooth, to reduce scattering effects. A flat surface may be a surface having that deviates in angle by less than 5 degrees, preferably less than 1 degree. A smooth surface may be a surface having a root-mean-square (RMS) roughness height of no more than 150 nm, preferably less than 80 nm, and more preferably less than 50 nm.

At least one partially reflective element 250, 251 is positioned between two adjacent LED elements, and is arranged to directly receive light (i.e. light that has not passed through or otherwise interacted with another partially reflective element) from a (single) LED element. A partially reflective element positioned in this manner may be labelled a central partially reflective element or a non-edge partially reflective element.

The light incident surface 255 may be the outermost layer of the partially reflective element, or may be an inner layer (e.g. if the light incident surface were coated in a protective, preferably transparent, medium). As will be later explained, the light incident surface is a surface or interface that interacts with light to at least partially reflect the light.

Each partially reflective element 250, 251, 260 is configured to reflect a first part 281 of light 280 incident on the partially reflective element and transmit a second part 282 of light incident on the partially reflective element. The partially reflective element 250, 251 uses the light incident surface 255 (and optionally, one or more other interfaces) to reflect light, so that the first part 281 of reflected light comprises at least some light reflected using at least the light incident surface. In other words, the light incident surface 255 contributes to the reflecting performed by the partially reflective element.

By partially reflecting received light, the first part 281 appears to originate from a virtual source 218, 219 (or "virtual LED element") to the side of the LED element, thereby increasing the apparent density of LED elements in the LED array.

The light incident surface 255 is therefore defined as a surface that the partially reflective element 250, 251, 260 uses to reflect light, and may contribute to all or part of the reflection performed by the partially reflective element 250, 251.

Light that is reflected using the light incident surface from a single LED element's emission appears to originate from a same virtual source 218, 219, e.g. rather than different virtual sources, to improve a positional uniformity of the apparent density of the LED array. This configuration also reduces a likelihood that light will be reflected back to the LED element (instead of output by the LED luminaire 200).

A partially reflective element may be configured so that the reflection of all directly received light appears to originate from a same virtual source. This may be achieved by aligning all interfaces (that contribute to the reflection of light) in parallel with each other and perpendicular to the first plane 290.

In some examples, the LED elements have an intensity distribution having mirror symmetry with respect to one or more planes ("mirror planes"), which are typically perpendicular to the plane in which the LED element (or LED array) lies. One example of such an LED element, having single plane mirror symmetry, is illustrated in FIG. 1. In such examples, each partially reflective element may positioned to be parallel to a mirror plane.

Preferably, the luminous intensity distribution of light emitted by each LED element is identical.

In some embodiments, the LED elements have an intensity distribution have mirror symmetry with respect to a finite number of planes ("mirror planes"), e.g. 1 plane (as illustrated in FIG. 1), 2 planes or 4 planes. In such embodiments, it is preferable for each partially reflective element to be positioned to be parallel to a mirror plane. Of course, it is envisaged that an LED element may have an intensity distribution having full rotational symmetry, i.e. an infinite number of mirror planes.

Preferably, the partially reflective elements 250, 251 are configured such that transmission and/or reflection of light incident thereon (e.g. on the light incident surface) is specular or near-specular. This helps ensure that the total (angular) light distribution is effectively unchanged in the LED luminaire as a whole.

That being said, introduction of a (slight) diffuse component for the light reflected or transmitted by the partially reflective element(s) may smoothen the distribution of light from the LED luminaire, which could eliminate the need for a separate light diffuser. In particular, it is preferable for the main direction of the specular reflected or transmitted light to be maintained, so-called forward scattering. The deviation from the specular direction may deviate as described by a Gaussian distribution with a standard deviation of 0.5-5 degrees (to achieve a "slight" diffuse component).

The light incident surface of each partially reflective element may be positioned to lie parallel or perpendicular to a hypothetical line passing through two adjacent LED elements (which may vary for different partially reflective elements).

Each central partially reflective elements 250, 251 may be positioned such that a virtual source of light 218 (or "virtual LED element") reflected by the partially reflective element is positioned to lie partway between two adjacent LED elements (including the LED element from which the partially reflective element directly receives light).

In particular, the virtual LED element may be positioned between 0.2 and 0.6 times the distance from the LED element 215 from which the partially reflective element 250 directly receives light as the adjacent LED element 216 is distant.

For example, the virtual LED element 218 may be positioned approximately half the distance (±5% or ±1%), or an odd integer multiple thereof, from the LED element 215 from which the central partially reflective element 250 directly receives light, as the adjacent LED element 216 is distant from said LED element.

As illustrated, this may be achieved by positioning each central partially reflective element so that a horizontal position of each central partially reflective element intersects a hypothetical line passing through a first LED element 215 (the LED element from which the central partially reflective element directly receives light) and a second LED element 216 (the adjacent LED element) at an intersection position, wherein a distance $d_2$ between the intersection position and a first LED element 215 is between 0.1 and 0.4 times the distance $d_1$ between the first LED element 215 and the second LED element 216.

In other words, the distance $d_2$ between each central partially reflective element and the LED element from which it directly receives light is between 0.1 and 0.4 times the distance $d_1$ between the LED element from which it directly receives light and the adjacent LED element.

Preferably, the distance between each central partially reflective element and the LED element from which it directly receives light is between 0.2 and 0.3 times the distance between the LED element from which it directly receives light and the adjacent LED element, and more preferably, between 0.23 and 0.27 times the distance between the LED element from which it directly receives light and the adjacent LED element. This makes the virtual LED element appear more centrally between the two LED elements, increasing an apparent/effective positional uniformity of the real and virtual LED elements in the overall LED array.

Where LED elements of an LED array are positioned at regular pitch intervals, a central partially reflective element may be positioned to lie between 0.1 and 0.4 of a pitch interval from an LED element. Preferably, a central partially reflective element is positioned to lie between 0.2 and 0.3 of a pitch interval from an LED element.

As previously noted, for the sake of distinction, the previously described partially reflective elements (which are positioned between two adjacent LED elements) may be labelled "central partially reflective elements". The optical element 220 may also comprise one or more "side partially reflective elements" 260. Each side partially reflective element is analogous to a previously described (central) partially reflective element 250, but is not positioned between two adjacent LED elements. Rather, a side partially reflective element 260 is positioned at a side edge of the LED array. Other elements of the side partially reflective element 260 may be as embodied for a previously described partially reflective element.

In particular, a side partially reflective element may lie upon a hypothetical line intersecting the LED element (from which it directly receives light) and an adjacent LED element, but not in between the LED element (from which it directly receives light) and the adjacent LED element.

The effect of the side partially reflective element is to provide a virtual LED element 219 outside the bounds of the LED array 210. This increases an apparent size of the LED array, and thereby an average brightness across the overall LED luminaire to improve comfort to a viewer by reducing glare.

The (horizontal) distance $d_2$ between the side partially reflective element 260 and the LED element 215 (at the edge of the LED array) may be between 0.2 and 0.6 times the distance between the LED element 215 from which the side partially reflective element 260 directly receives light and an LED element 216 adjacent thereto.

In some embodiments, each partially reflective element 250, 251, 260 is one of two partially reflective elements 250, 251, 260 that form a set of two partially reflective elements.

The set of two partially reflective elements are positioned in parallel to one another, and are positioned so that light reflected by a first partially reflective element 250 (of the set) is a mirror image of light reflected by a second partially reflective element 251 (of that set).

This is achieved, in the illustrated embodiment, by positioning the first partially reflective element 250 on a first side of a first LED element 215 and positioning the second partially reflective element 251 on a second side of a second LED element 216, where the first and second partially reflective elements are parallel to one another, and the distribution of light output by the first and second LED elements are substantively identical (within reasonable manufacturing tolerances).

The distance between the first partially reflective element 215 and the first LED element be the same as the distance between the second partially reflective element and the second LED element 216.

In particular examples, each partially reflective element 250, 260 of a set of partially reflective elements positioned either side of a same LED element 215. However, this is not essential.

From the foregoing description, it will be clear that light 280 (emitted from an LED element 215 and) incident upon a (central or side) partially reflective element 250, 251, 260 is conceptually divisible into reflected light 281 and transmitted light 282. A light incident surface 255, perpendicular to the first plane 290, contributes to at least some of the reflection process. In other words, a light incident surface is used to perform at least some of the reflecting.

The light incident surface thereby acts as an interface that reflects some of the light incident thereon. The partially reflective element may use one or more interfaces (e.g. transitions between different materials or substances, e.g. a glass-air interface or an air-metal interface) to perform reflection.

The division of incident light may be done chromatically, e.g. different wavelengths of light are reflected or transmitted, by intensity, e.g. a certain amount of each wavelength of light is reflected or transmitted, and/or spatially, e.g. certain areas of the partially reflective element transmit light and other areas reflect light.

Of course, these divisions may be combined, e.g. to divide by both intensity and wavelength, so that a certain percentage of a first set of wavelengths is transmitted (with the rest of that set being reflected) and a different percentage of a second set of wavelengths is transmitted (with the rest of that set being reflected). Other suitable combinations would be apparent to the skilled person.

In one embodiment, the partially reflective element comprises a perforated reflective element, i.e. a reflective element comprising one or more perforations or holes. The surface of the perforated reflective element may act as the light incident surface. A suitable example of a reflective element may comprise a metallic reflector. Light that reaches a hole is transmitted by the partially reflective element, and light incident on other portions (i.e. the light incident surface) of the perforated reflective element is reflected. In this way, the light incident on the partially reflective element is partially transmitted (though the perforations) and partially reflected (from other portions of the perforated reflective element). Thus, light incident on the partially reflective element is spatially divided into transmitted and reflected light.

The perforated reflective element is an example of a partially reflective element that uses only one interface to perform reflection—although both sides of the perforated reflective element may be reflective (for light received from either side).

In another embodiment, the partially reflective element comprises a transmissive (e.g. clear) element having a partially reflective coating, which may form an entire side of the partially reflective element (e.g. a side upon which light is incident). In this embodiment, the partially reflective coating acts as the light incident surface. The transmissive element provides a support for the partially reflective coating. Light incident on the partially reflective coating is partially reflected and partially transmitted.

To avoid light transmitted by a partially reflective element being reflected as it exits said element, the partially reflective coating may be formed on only a single side of the transmissive element, e.g. a side most proximate to an LED element or a "light entry surface" (such as the light incident surface 255). Alternatively, the partially reflective element may be positioned on a light exit surface of the transmissive element, so that light is transmitted through the transmissive element before being partially reflected back through the transmissive element. Provision of the partially reflective coating on a single side of the transmissive element increases a uniformity of light intensity output by each virtual LED element across the LED array.

In one sub-embodiment, the partially reflective coating is configured to divide light incident thereon by intensity only, e.g. transmitting a certain amount of all light incident thereon and reflecting a certain amount of all light incident thereon. This can be achieved using a thin coating of a metallic reflector, such as aluminum or silver, although other methods would be apparent to the skilled person. As another example, a stack of thin films/plates could be used, such that the Fresnel reflections of the stack interfaces sum up to a certain amount. As yet another example, a single coating of a substance with a high refractive index (e.g. $n>1.5$, $n>1.65$, $n>1.7$ or $n>1.9$), such as $SNO_2$, $Sb_2O_5$, $ZrO_2$, $TiO_2$, $CeO_2$, $ZrO_2$, or a polycarbonate coating could be used.

In another sub-embodiment, the partially reflective coating is configured to divide light incident thereon chromatically, e.g. using a dichroic coating such as a multilayer stack of thin layers of materials with different refractive indices (analogously to a Bragg reflector). Thus, a (certain percentage of a) first set of wavelengths of light incident thereon may be transmitted, whereas a (certain percentage of a) second set of wavelengths may be reflected. It is acknowledged that an angle of incident light may affect the wavelengths of light that are transmitted/reflected, but will not significantly change the proportion of overall light that is transmitted/reflected (assuming incident light is white).

If the partially transmissive elements are positioned to be parallel to a mirror plane and each of the light rays has its own, unique corresponding mirror image reflected light ray, then the spectrum of the LED luminaire will be the same as the spectrum of the luminaire element without the optical element.

In other embodiments, the partially reflecting element omits the transmissive element, e.g. so that the partially reflective coating is provided as a stand-alone partially reflective element. This is possible when the partially reflective coating would, by itself, be capable of self-supporting, e.g. if the partially reflective element comprises a stack of thin films/plates or the like.

In one simple example, the partially reflective element comprises a slab of transmissive elements, as light incident on such a slab of transmissive elements will incur Fresnel reflections, of typically between 8-20% depending upon the material/angle of incidence. One or more surfaces of the slab of transmissive elements may act as the light incident surface.

The partially reflective element may be configured to reflect between 25% and 75%, of the received light, e.g. between 40% and 60% of the received light, for example, between 45% and 55%, for example, between 48% and 52%, of the received light. In particular examples, the partially reflective element may be configured to reflect around 50% (±1% or ±0.5%) of the received light.

The partially transmissive element may be configured to transmit between 25% and 75%, of the received light, e.g. between 40% and 60% of the received light, for example, between 45% and 55%, for example, between 48% and 52%, of the received light. In particular examples, the partially transmissive element may be configured to transmit around 50% (±1% or ±0.5%) of the received light.

In yet more preferable embodiments, the partially transmissive element may be configured to transmit no less than 45% of the received light and reflect no less than 45% of the received light, e.g. transmit no less than 48% of the received light and reflect no less than 48% of the received light, e.g. transmit no less than 49% of the received light and reflect no less than 49% of the received light.

A more even distribution between transmitted and reflected light (e.g. trending towards 50-50) results in a balancing of the apparent brightness of the real and virtual light sources, further reducing glare without necessitating the provisional of additional "real" LED elements.

Thus, the amount of light transmitted and the amount of light reflected by each partially reflective element is preferably substantially (e.g. ±10%, more preferably ±5% or even more preferably ±1%) the same.

For the embodiment illustrated in FIG. 2, the height of each (central or side) partially reflective element 250, 251 is preferably no less than 2 mm, e.g. no less than 4 mm. In such examples, the height is preferably no more than 10 mm, e.g. the height may be between 2 mm and 10 mm and/or 4 mm and 10 mm.

Preferably, the height of the partially reflective elements should be as great as possible (whilst still fitting within the overall housing of the luminaire, e.g. if it has a protective element).

The height of each partially reflective element 250, 251 may, for example, be no less than 10% of the distance between two adjacent LED elements, e.g. no less than 50% of the distance between two adjacent LED elements. The greater the height of the partially reflective elements, the greater the glare reduction by increasing the uniformity of brightness distribution across the LED luminaire.

In FIG. 2, the partially reflective elements 250, 251, 260 are illustrated as being positioned a same distance from the LED element from which they directly receive light. In other words, a distance between a first partially reflective element 250 and a first LED element 215 (from which it directly receives light) is shown as being substantially the same as a distance between a second partially reflective element 251 and a second LED element 216 (from which it directly receives light).

However, in some embodiments, at least two (e.g. each) partially reflective elements are positioned a different distance, e.g. a pseudo-random distance, from their respective LED elements. A slight randomization or difference in the relative (to an LED element) position of the partially reflective elements increases a uniformity of the brightness distribution provided by the LED luminaire, by reducing the impact of providing the partially reflective elements (e.g. reducing the appearance of darker lines which may be created by the partially reflective elements along their length).

Preferably, the distances are no more than ±10% different from one another.

Another property that could have an effect of the efficacy of the LED luminaire is the shape (e.g. thickness or rounding) of the partially reflective element. Preferably, as illustrated, each partially reflective element has a largely cuboidal shape, having one or more interfaces (e.g. the light incident surface 255) that partially reflect and partially transmit light incident thereon.

The thickness of each partially reflective element is preferably no greater than 1 mm, e.g. no greater than 0.8 mm, e.g. no greater than 0.5 mm. The thickness of a partially reflective element may be defined as the maximum dimension along a direction between the two LED elements between which the partially reflective element is disposed. The lower the thickness, the fewer artifacts in the luminous intensity of the LED element (created by the interactions with both sides of the partially reflective element) and the better the relative luminous intensity of the overall luminaire (due to reduced absorption).

Preferably, a top edge of each partially reflective element (i.e. an edge most distance from the first plane) has a rounding of no less than 0.2 mm (in radius), and preferably no less than 0.1 mm (in radius). The lower the rounding radius, the better the luminous output of the luminaire (due to reducing scattering).

Figure 3:
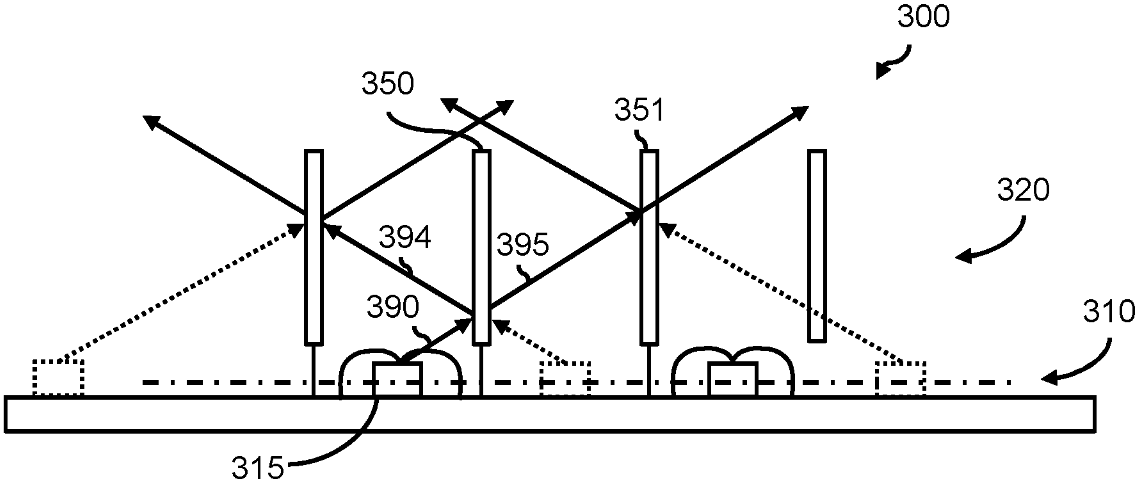
FIG. 3 is a side view illustrating components of an LED luminaire according to another embodiment.

FIG. 3 illustrates an LED luminaire 300 according to another embodiment of the invention.

The LED luminaire 300 of FIG. 3 differs from the LED luminaire 200 of FIG. 2 in that the partially reflective elements 350, 351 of the optical array 320 are configured to further receive a reflected first part of light 394 and/or transmitted second part of light 395 that was received by at least one other partially reflective element, and is further configured to partially reflect and partially transmit the received first and/or second part of light.

In other words, light transmitted by one partially reflective element 350 is submitted to a partial transmission, partial reflection, operation by another partially reflective element 351. This creates multiple virtual sources at a longer distance from the original source. Moreover, these virtual sources may lie outside the area of the real light sources.

FIG. 3 illustrates some transmittance and reflection undergone by a ray of light 390 emitted by an LED element 315 of the LED array 310, for the purpose of understanding. It can be seen how a single ray of light, interacting with a plurality of different partially reflective elements 350, 351, can result in the creation of a plurality of different virtual LED elements or light sources.

The LED luminaire 300 increases the effective size of the source area (of light), which further reduces the glare of the overall LED luminaire.

Moreover, using multiple partially reflective elements to reflect/transmit light emitted by an LED element in this manner enables the use of partially reflective elements with a reduced reflectivity, e.g. to make use of cheaper, more abundant or more economic/ecological materials. This is because the use of multiple partially reflective elements create additional virtual elements (e.g. beyond the physical boundaries of the LED array). In this way the total magnitude of light output by the luminaire is maintained, whilst further decreasing glare.

In particular examples, the length or height of the partially reflective elements, in a direction perpendicular to the first plane 290 (and in particular, the length/height of the light incident surface of the partially reflective element) may be no less than 0.4 times the distance between two adjacent LED elements of the LED array, preferably no less than 1 times this distance and even more preferably no less than 2 times this distance. The longer/higher the partially reflective element(s), the greater the extension of apparent size of the luminaire.

Purely by way of example, where a distance between two adjacent LED elements of the LED array is around 25 mm, the length height of each partially reflective element is preferably no less than 10 mm, for example, no less than 15 mm, for example, no less than 45 mm/50 mm. Other suitable distances between two adjacent LED elements would be apparent to the skilled person, for example between 3 and 50 mm, e.g. between 3 and 10 mm (for indoor applications) or between 15-30 mm for outdoor lighting applications. Conceivably, e.g. for large area luminaires that cover a ceiling, larger distances are feasible, such as a distance between 10 and 30 cm.

The partially reflective elements closer to the edges of the LED array will have fewer interactions with light rays compared to the partially reflective elements in the middle of the LED array. It may therefore be advantageous to have a more highly reflective partially reflective luminaire towards the sides of the LED array compared to towards the center/middle. This will result in improved uniformity of the apparent brightness of light output by virtual sources across the luminaire.

Similarly, light rays having a greater angle with respect to the first plane have fewer interactions with partially reflective elements compared to light rays emitted closer to the first plane (at a lower angle). It may therefore be advantageous for at least one partially reflective element to have a greater reflectivity at a position more distant from the first plane than a position closer to the first plane. By way of example, a partially reflective element may have a gradient in reflectivity of the partially reflective element with respect to distance from the first plane or LED array, so that there is a higher reflectivity at the far end of the plate and a lower reflectivity closer to PCB. This gradient may be a gradual gradient or a step gradient. Such embodiments will result in improved brightness uniformity of light emitted by the LED luminaire, which is achieved by increasing a brightness uniformity of virtual LED elements across the LED array.

Figure 4:
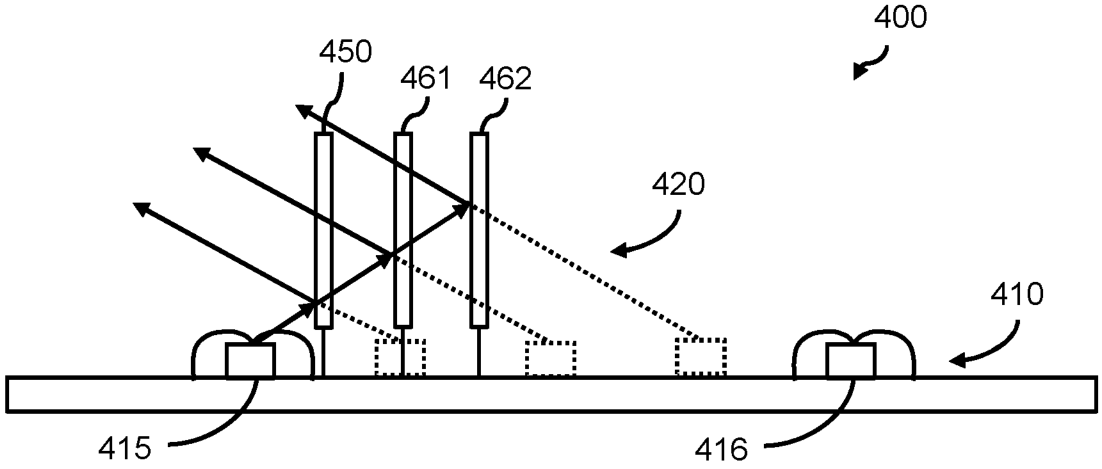
FIG. 4 is a side view illustrating components of an LED luminaire according to yet another embodiment.

FIG. 4 illustrates an LED luminaire 400 according to another embodiment of the invention. The LED luminaire 400 of FIG. 4 differs from the LED luminaire 200 of FIG. 2 in that the optical element 420 comprises one or more additional partially reflective elements 461, 462. Only a part of the optical element associated with a single LED element is illustrated for the sake of clarity.

In particular, the optical element 420 comprises a partially reflective element 450 positioned so as to directly receive light emitted by an LED element 415 of an array 410 of LED elements. This partially reflective element is configured analogously to previously described partially reflective elements.

The optical element 420 further comprises additional partially reflective elements 461, 462, each of which differ from the partially reflective element 450 in that they do not directly receive light emitted from an LED element. Rather, the additional partially reflective elements 461, 462 only receive light transmitted and/or reflected from a partially reflective element 450 and/or another additional partially reflective element 461.

This creates additional virtual sources interspersed between two adjacent LED elements, as illustrated, thereby increasing a uniformity of the brightness of light emitted by the luminaire. In particular, each additionally partially reflective element may create a virtual source or virtual LED element that lies between an LED element from which it receives non-reflected light (e.g. transmitted light only) and an adjacent LED element.

The other features of the additional partially reflective element 461, 462 may be embodied for the previously described partially reflective elements. For example, each partially reflective element is adapted to partially reflect and partially transmit indecent light thereon. Similarly, each additional partially reflective element comprises a light incident surface, perpendicular to the plane of the LED array, which contributes to the reflection of light by the additional partially reflective element.

The (horizontal) distance between each additional partially reflective elements and the LED element from which it receives non-reflected light (e.g. transmitted light only) is preferably between 0.1 and 0.4 times the distance between said LED element 415 and the adjacent LED element 416, and preferably between 0.2 and 0.4 times the distance between said LED element and the adjacent LED element.

The precise distance will depend upon the position of the partially reflective element 450 that transmits the light incident on the additional partially reflective element.

Preferably, the distance between each additional partially reflective element and the LED element from which it receives non-reflected light (e.g. transmitted light only) is a multiple of a distance between the partially reflective element that transmits the non-reflected light (incident on the additional partially reflective element) and the said LED element.

FIGS. 5 to 10 illustrates some top-down views of suitable configurations or placements of the partially reflective element(s) with respect to an LED array. Exemplary or potential locations of virtual sources, for the different positions/placements of the partially reflective element(s) are illustrated in dotted outline.

Figure 5:
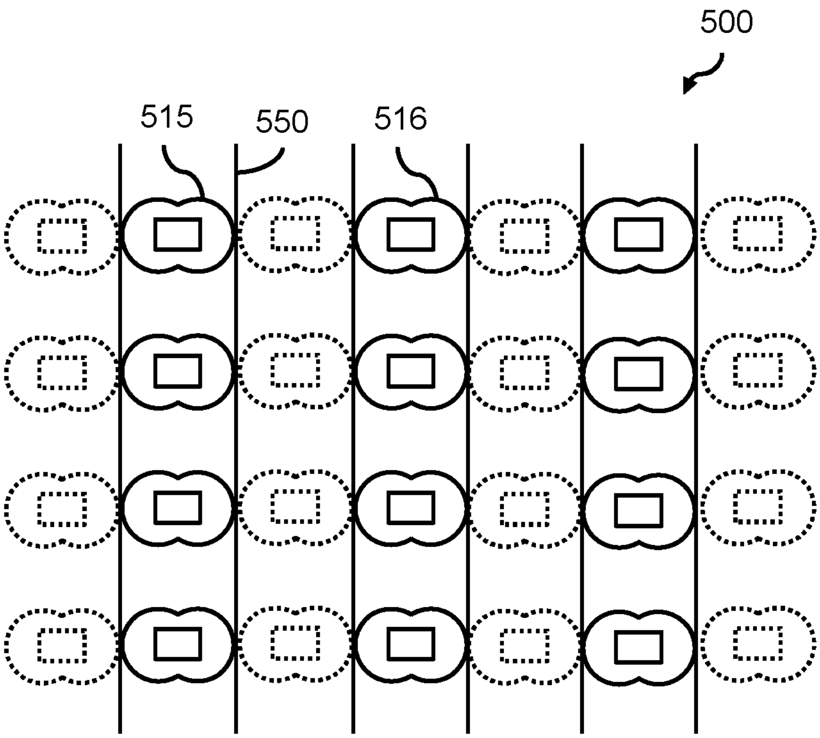
FIGS. 5 to 10 illustrate top-down views of different configurations for an LED luminaire according to various embodiments.

FIG. 5 illustrates an LED luminaire 500 comprises a 2D rectangular LED array of LED elements 515, 516 with lenses that give an intensity distribution having mirror symmetry with respect to one (single) plane. Each partially reflective element 550 is placed to be perpendicular to the plane of the LED array, and are positioned a quarter of the distance between a first 515 and second 516 LED element of the array of LED elements.

In particular examples, and as illustrated, where the LED elements have an intensity distribution having mirror symmetry with respect to one (single) plane, each partially reflective element is positioned to be parallel to a mirror plane of at least one LED element, resulting in the reflected and transmitted parts of the beam still adding up to the original beam distribution.

Figure 6:
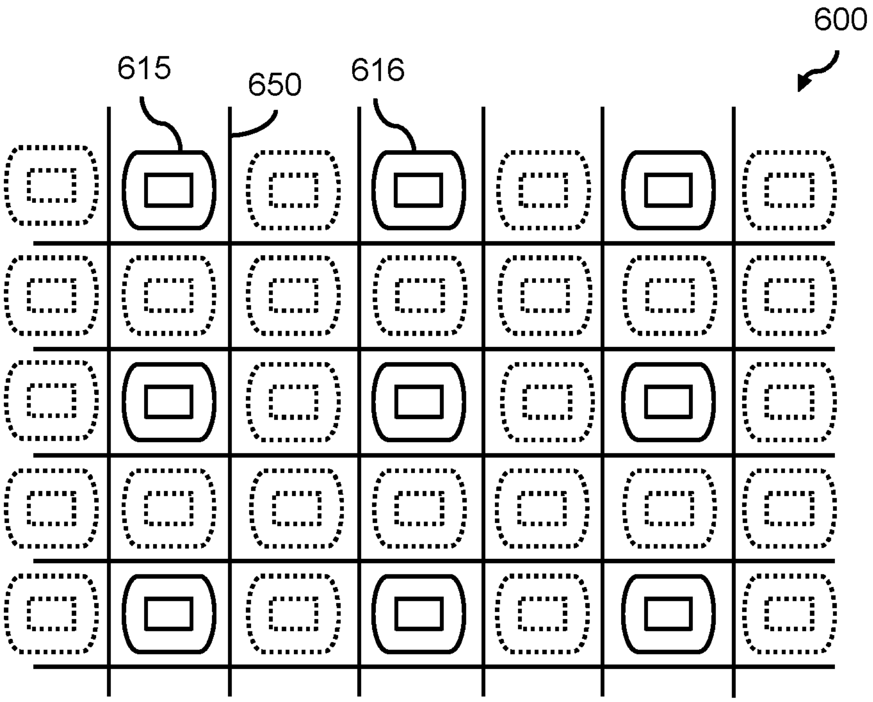

FIG. 6 illustrates another LED luminaire 600 comprising a 2D rectangular LED array of LED elements 615, 616 with lenses that provide a light intensity distribution that has quadratic symmetry (i.e. so that an intensity distribution has mirror symmetry with respect to two orthogonal planes). Each partially reflective element 650 is again positioned to be perpendicular to the plane of the LED array, and are positioned a quarter of the distance between a first 615 and second 616 LED element of the array of LED elements.

In particular examples, and as illustrated, to maintain the original light beam distribution, each partially reflective element is again positioned to be parallel to a mirror plane of at least one LED element. As the LED elements have a light intensity distribution having quadratic symmetry, different partially reflective elements can be perpendicular to one another.

The configuration illustrated in FIG. 6 may further comprise one or more diagonally positioned partially reflective elements (e.g. parallel to a diagonal line of LED elements). This is of particular advantage if the intensity distribution of each LED element has mirror symmetry along a diagonal line of the LED elements, e.g. full rotational symmetry.

Figure 7:
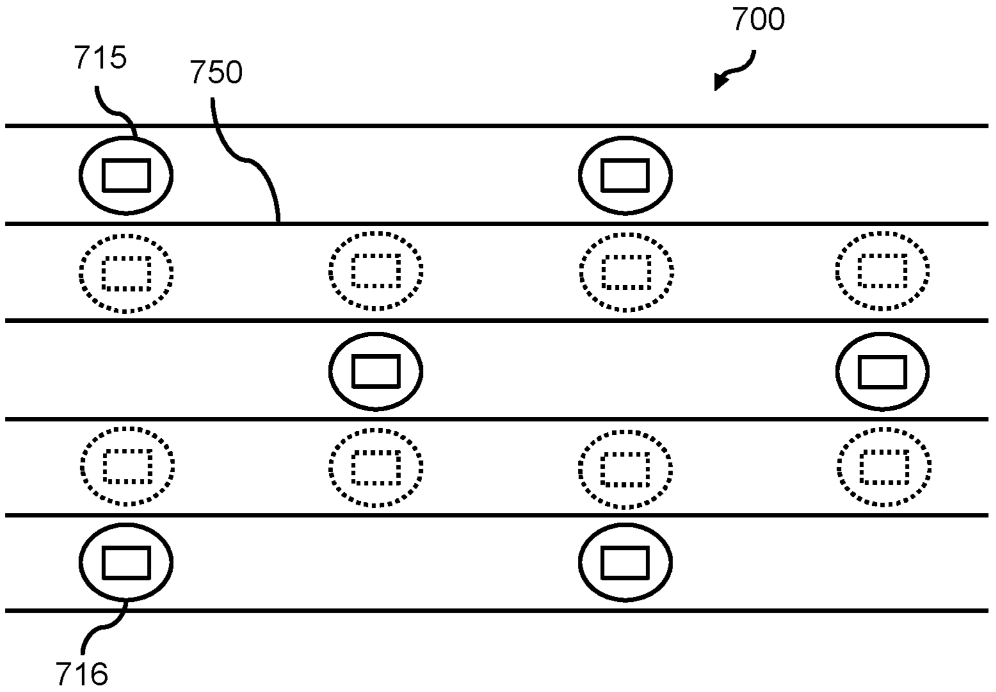

FIG. 7 illustrates another LED luminaire 700 comprising a 2D rectangular LED array of LED elements 715, 716 with lenses that given an intensity distribution with full rotational symmetry (e.g. effectively even in all directions, so that it is mirror symmetric in all planes perpendicular to the LED array). The LED elements are staggered.

Each partially reflective element 750 of the LED luminaire 700 is again placed to be perpendicular to the plane of the LED array, and therefore parallel to a mirror plane of each LED element, but is positioned to be an eighth of the distance between a first LED element 715 and a second LED element 716.

In the illustrated example, each partially reflective element 750 is sufficiently tall in height so that light emitted by an LED element can interact with multiple (e.g. at least two) partially reflective elements. It should be noted that only the virtual sources corresponding to the illustrated LED elements are illustrated.

Figure 8:
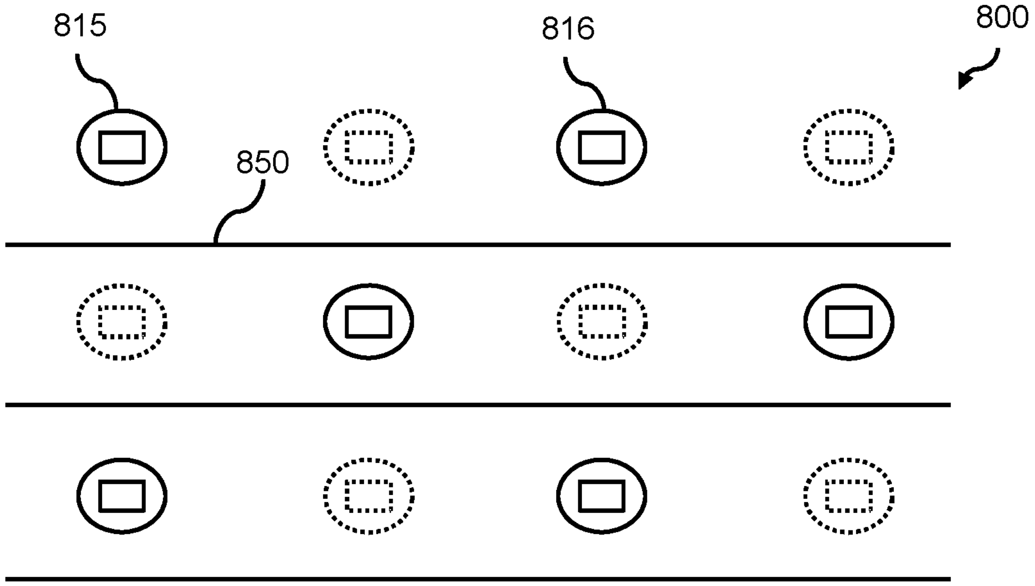

FIG. 8 illustrates another LED luminaire 800 comprising a 2D rectangular LED array of LED elements 815, 816 with lenses that given an intensity distribution with rotational symmetry (e.g. effectively even in all directions, so that it is mirror symmetric in all planes perpendicular to the LED array). The LED elements are again staggered.

Each partially reflective element 850 of the LED luminaire 800 is again placed to be perpendicular to the plane of the LED array, but is positioned to be a quarter of the distance between a first LED element 815 and a second LED element 816. This results in an LED luminaire having effective LED elements (i.e. combined real and virtual LED elements) that are evenly spaced with respect to one another, thereby having improved brightness uniformity.

Figure 9:
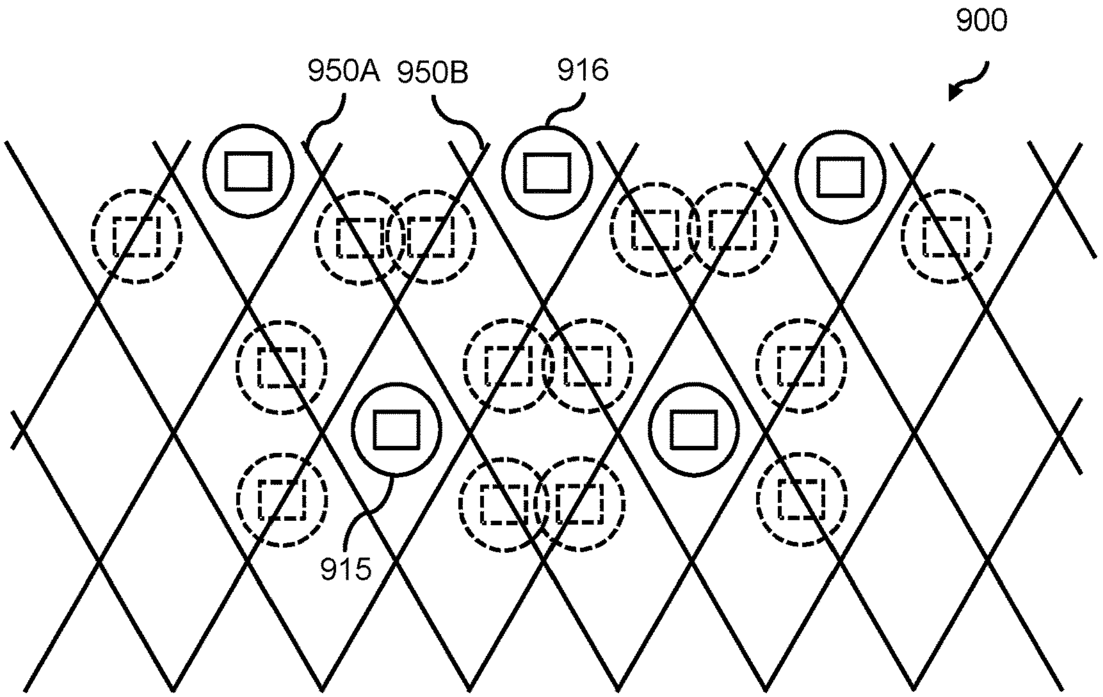

FIG. 9 illustrates yet another LED luminaire 900 comprising a 2D rectangular LED array of LED elements 915, 916 with lenses that given an intensity distribution with rotational symmetry (e.g. effectively even in all directions, so that it is mirror symmetric in all planes perpendicular to the LED array). The LED elements are again staggered.

Each partially reflective element 950A, 950B of the LED luminaire 900 is again placed to be perpendicular to the plane of the LED array (and here therefore parallel to a mirror plane of light intensity output). Each partially reflective element is again positioned to be a quarter of the distance between a first LED element 915 and a second LED element 916

Each partially reflective element is here diagonally positioned, compared to previous examples. In particular, a first set of partially reflective elements is configured to be 60° offset or angled with respect to a second set of partially reflective elements.

Figure 10:
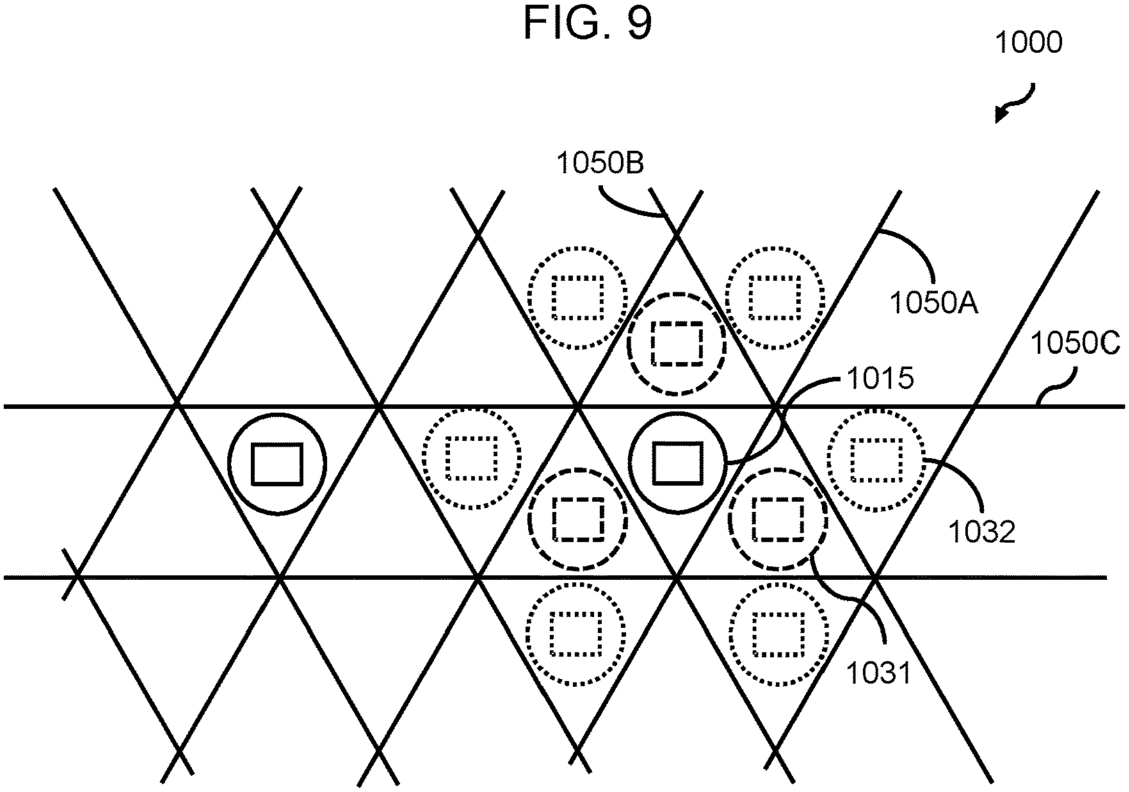

FIG. 10 illustrates yet another LED luminaire 1000 comprising a 2D rectangular LED array of LED elements 1015 with lenses that given an intensity distribution with rotational symmetry (e.g. effectively even in all directions, so that it is mirror symmetric in all planes perpendicular to the LED array). The LED elements are again staggered.

Each partially reflective element 1050A, 1050B, 1050C of the LED luminaire 1000 is again placed to be perpendicular to the plane of the LED array (and here therefore parallel to a mirror plane of light intensity output).

The partially reflective elements are positioned diagonally, i.e. diagonal partially reflective elements 1050A, 1050B, and horizontally, i.e. horizontal partially reflective element 1050C.

A number of virtual sources 1031, 1032 associated with a single LED element are illustrated in dashed/dotted lines. A first set of virtual sources 1031 are illustrated with dashed lines, and indicate virtual sources that result from an interaction/encounter with only a single partially reflective element. A second set of virtual sources 1032 are illustrated with dotted lines, and indicate virtual sources that result from an interaction/encounter with two reflective elements (and may, therefore not be present if the partially reflective elements are not sufficiently tall).

The configuration of FIG. 10 provides a LED luminaire 1000 having an increased number of virtual sources, compared to other examples, thereby further reducing perceived glare.

The configuration of FIG. 10 may comprise further partially reflective elements positioned vertically with respect to the 2D rectangular LED array, e.g. in the manner illustrated in FIG. 6. This would further increase the number of virtual sources.

The LED luminaire illustrated in FIGS. 9 and 10 may, of course, be configured to have a non-staggered array of LED elements (e.g. there is an equal distribution of LED elements in a vertical and horizontal direction).

In all embodiments illustrated in FIGS. 5 to 10, the partially reflective elements are positioned to be parallel to a line of the LED elements. Whilst this feature is not essential, it does form a preferred aspect of the invention, to help ensure that virtual sources are positioned between real LED elements, thereby increasing a uniformity of the brightness of light output by the LED luminaire.

In all embodiments illustrated in FIGS. 5 to 10, each partially reflective elements is positioned to be parallel to a mirror plane of an LED element. Whilst this feature is not essential, it does form a preferred aspect of the invention, to help ensure that a (angular) light distribution of the overall LED luminaire remains effectively constant.

In the embodiments illustrated in FIGS. 5 to 10, the distance between a partially reflective element and the LED element from which is directly receives light is either an eighth or a quarter of the distance between said LED element and an adjacent LED element. However, other distances are contemplated, e.g. between 0.1 and 0.4 times the distance between said LED element and the adjacent LED element.

In the context of the present disclosure, a "transmissive element" is any material that transmits a majority of light incident thereon, e.g. transmits no less than 80% of non-absorbed light incident thereon and preferably no less than 90% of non-absorbed light incident thereon (e.g. glass).

In the context of the present disclosure, an adjacent LED element is a most proximate LED element lying in a particular/predetermined direction along the first plane, i.e. the plane of the LED array. In the context of the present disclosure, a distance generally refers to a horizontal distance, i.e. a distance along the first plane.

Preferably, partially reflective elements have very low absorption, e.g. <20% of incident light is absorbed, more preferably, <10% of incident light is absorbed.

The skilled person will appreciate that the illustrated virtual sources may not always be visible to a viewer of the LED luminaire viewing from a single direction, but are intended to represent general positions for virtual sources of the overall LED luminaire. It is also noted that only some of the possible virtual sources may be illustrated (as the number of virtual sources may depend upon at least the height of the partially reflective elements) and are provided purely for the sake of improved understanding.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. If the term "adapted to" is used in the claims or description, it is noted the term "adapted to" is intended to be equivalent to the term "configured to".

Any reference signs in the claims should not be construed as limiting the scope.

The invention claimed is:

1. An LED luminaire comprising:

an array of LED elements, each configured to emit light, disposed in a first plane; and an optical element comprising one or more partially reflective elements, each partially reflective element being positioned so as to directly receive light emitted by an LED element of the array of LED elements and comprising a light incident surface positioned perpendicularly to the first plane and, wherein each partially reflective element is configured to reflect a first part of received light using at least the light incident surface such that the first part appears to originate from a virtual light source and transmit a second, different part of the received light, and wherein at least one partially reflective element is positioned such that the virtual light source of the first part of the directly received light, which is reflected using the light incident surface, lies between the LED element from which the partially reflective element directly receives light and an adjacent LED element.

2. The LED luminaire of claim 1, wherein:

each LED element of the array of LED elements is configured to emit light having a luminous intensity distribution having at least one mirror symmetry plane, the light incident surface of each partially reflective element is positioned in parallel to a mirror symmetry plane of one or more luminous intensity distributions of an LED element from which it directly receives light, wherein the luminous intensity distribution of light emitted by each LED element is identical.

3. The LED luminaire of claim 2, wherein the luminous intensity distribution of light emitted by each LED element of the array of LED elements has a finite number of mirror symmetry planes.

4. The LED luminaire of claim 1, wherein the distance between each partially reflective element and the LED element from which it directly receives light is between 0.1 and 0.4 times the distance between the LED element from which it directly receives light and the adjacent LED element.

5. The LED luminaire of claim 1, wherein the thickness of each partially reflective element is no greater than 1 mm.

6. The LED luminaire of claim 1, wherein at least one partially reflective element is configured to further receive a reflected first part of light and/or a transmitted second part of light that was directly received by at least one other partially reflective element, and is further configured to partially reflect and partially transmit the received first and/or second part of light.

7. The LED luminaire of claim 1, wherein at least one partially reflective element has a length, in a direction perpendicular to the first plane, of no less than 0.4 times the distance between the LED element from which it directly receives light and the adjacent LED element, and no less than 1 times the distance between the LED element from which it directly receives light and the adjacent LED element.

8. The LED luminaire of claim 1, wherein the first part and/or second part of the received light comprises no less than 25%, and no more than 75%, of the received light.

9. The LED luminaire of claim 8, wherein the first part and/or second part of the received light comprises no less than 45%, and no more than 55%, of the received light.

10. The LED luminaire of claim 1, wherein: the first part of the received light comprises no less than 75% of the received light having a wavelength lying within a first set of wavelengths; and the second part of the received light comprises no less than 75% of the received light having a wavelength lying within a second, different set of wavelengths.

11. The LED luminaire of claim 1, wherein at least one partially reflective element is configured such that, where the received light comprises a plurality of light rays, each light ray is partially transmitted and partially reflected by the partially reflected element.

12. The LED luminaire of claim 1, wherein at least one partially reflective element comprises a light transmissive element coated with a partially reflective coating, such as a dichroic coating and/or a stack of one or more films or plates.

13. The LED luminaire of claim 1, wherein at least one partially reflective element comprises a perforated reflective element and/or at least one partially reflective element comprises a light transmissive element coated with a pattern of partially or fully reflective patches.

14. The LED luminaire of claim 1, wherein the array of LED elements comprises one or more lines of LED elements, wherein each partially reflective element is positioned to be parallel to a line of LED elements.

15. The LED luminaire of claim 1, wherein each LED element comprises a light emitting diode, LED, and a beam shaping optical element configured to direct light emitted by the light emitting diode.

* * * * *